United States Patent
Höchsmann et al.

(10) Patent No.: US 10,695,981 B2
(45) Date of Patent: Jun. 30, 2020

(54) COATER ARRANGEMENT FOR A 3D PRINTER

(71) Applicant: ExOne GmbH, Gersthofen (DE)

(72) Inventors: Rainer Höchsmann, Langenneufnach (DE); Alexander Müller, Diedorf-Vogelsang (DE); Sven Klaua, Augsburg (DE)

(73) Assignee: ExOne GmbH, Gersthofen (DE)

( * ) Notice: Subject to any disclaimer, the term of this patent is extended or adjusted under 35 U.S.C. 154(b) by 682 days.

(21) Appl. No.: 15/506,892

(22) PCT Filed: Aug. 26, 2015

(86) PCT No.: PCT/EP2015/069544
§ 371 (c)(1),
(2) Date: Jul. 27, 2017

(87) PCT Pub. No.: WO2016/030417
PCT Pub. Date: Mar. 3, 2016

(65) Prior Publication Data
US 2017/0341302 A1   Nov. 30, 2017

(30) Foreign Application Priority Data
Aug. 29, 2014 (DE) .......... 10 2014 112 450

(51) Int. Cl.
*B29C 64/205* (2017.01)
*B33Y 30/00* (2015.01)
(Continued)

(52) U.S. Cl.
CPC ............ *B29C 64/205* (2017.08); *B29C 64/20* (2017.08); *B29C 64/255* (2017.08); *B29C 64/30* (2017.08);
(Continued)

(58) Field of Classification Search
CPC ...... B29C 64/20; B29C 64/205; B29C 64/214; B29C 64/218; B29C 64/255;
(Continued)

(56) References Cited

U.S. PATENT DOCUMENTS

| | | |
|---|---|---|
| 5,647,931 A | 7/1997 | Retallick et al. |
| 7,748,971 B2 | 7/2010 | Hochsmann et al. |
| 2010/0044903 A1 | 2/2010 | Rhoades et al. |

FOREIGN PATENT DOCUMENTS

DE   102009056689 A1 *  6/2011  ............ B22F 3/1055

OTHER PUBLICATIONS

DE 10 2009 056689 A1, Hochsmann et al., machine translation Ger to Eng. (Year: 2011).*

* cited by examiner

*Primary Examiner* — Joseph S Del Sole
*Assistant Examiner* — Lawrence D. Hohenbrink, Jr.
(74) *Attorney, Agent, or Firm* — Philip Lane

(57) ABSTRACT

A coating device arrangement 1 for a 3D printer 100 is described, comprising a coating device 3 having a carrier structure 21a to 21c and a container 17 fixed to the carrier structure, defining an inner cavity for receiving particulate construction material, which leads to an opening for outputting the particulate construction material, a vibration device 23 configured to vibrate particulate construction material received in the container and thereby to influence the discharge of construction material from the opening, and a stroking member 15a attached to the coating device, configured to stroke particulate construction material output from the opening to thereby level and/or compress the output particulate material, and/or a closing device 31 configured to selectively close the opening and comprising a closing member 31a attached to the coating device 3, wherein the stroking member 15a and/or the closing mem- (Continued)

ber 31*a* are fixed to the carrier structure to be vibration-decoupled from the vibration generated by means of the vibration device in the container 17.

24 Claims, 13 Drawing Sheets

(51) Int. Cl.
| | |
|---|---|
| *B29C 64/20* | (2017.01) |
| *B29C 64/255* | (2017.01) |
| *B29C 64/30* | (2017.01) |
| *B29C 64/153* | (2017.01) |
| *B29C 64/165* | (2017.01) |
| *B22F 3/105* | (2006.01) |
| *B29C 64/307* | (2017.01) |
| *B29C 64/321* | (2017.01) |
| *B29C 64/214* | (2017.01) |
| *B29C 64/329* | (2017.01) |
| *B29C 64/343* | (2017.01) |
| *B29C 64/218* | (2017.01) |
| *B33Y 50/02* | (2015.01) |
| *B29C 64/245* | (2017.01) |

(52) U.S. Cl.
CPC .............. *B33Y 30/00* (2014.12); *B22F 3/1055* (2013.01); *B22F 2003/1056* (2013.01); *B22F 2003/1057* (2013.01); *B22F 2003/1058* (2013.01); *B22F 2999/00* (2013.01); *B29C 64/153* (2017.08); *B29C 64/165* (2017.08); *B29C 64/214* (2017.08); *B29C 64/218* (2017.08); *B29C 64/245* (2017.08); *B29C 64/307* (2017.08); *B29C 64/321* (2017.08); *B29C 64/329* (2017.08); *B29C 64/343* (2017.08); *B33Y 50/02* (2014.12); *Y02P 10/295* (2015.11)

(58) Field of Classification Search
CPC ... B29C 64/245; B29C 64/153; B29C 64/165; B29C 64/30; B29C 64/307; B29C 64/321; B29C 64/329; B29C 64/343; B33Y 30/00; B33Y 50/02; Y02P 10/295; B22F 3/1055; B22F 2003/1056; B22F 2003/1057; B22F 2003/1058; B22F 2999/00
USPC ......................................................... 425/162
See application file for complete search history.

closing device open closing device closed

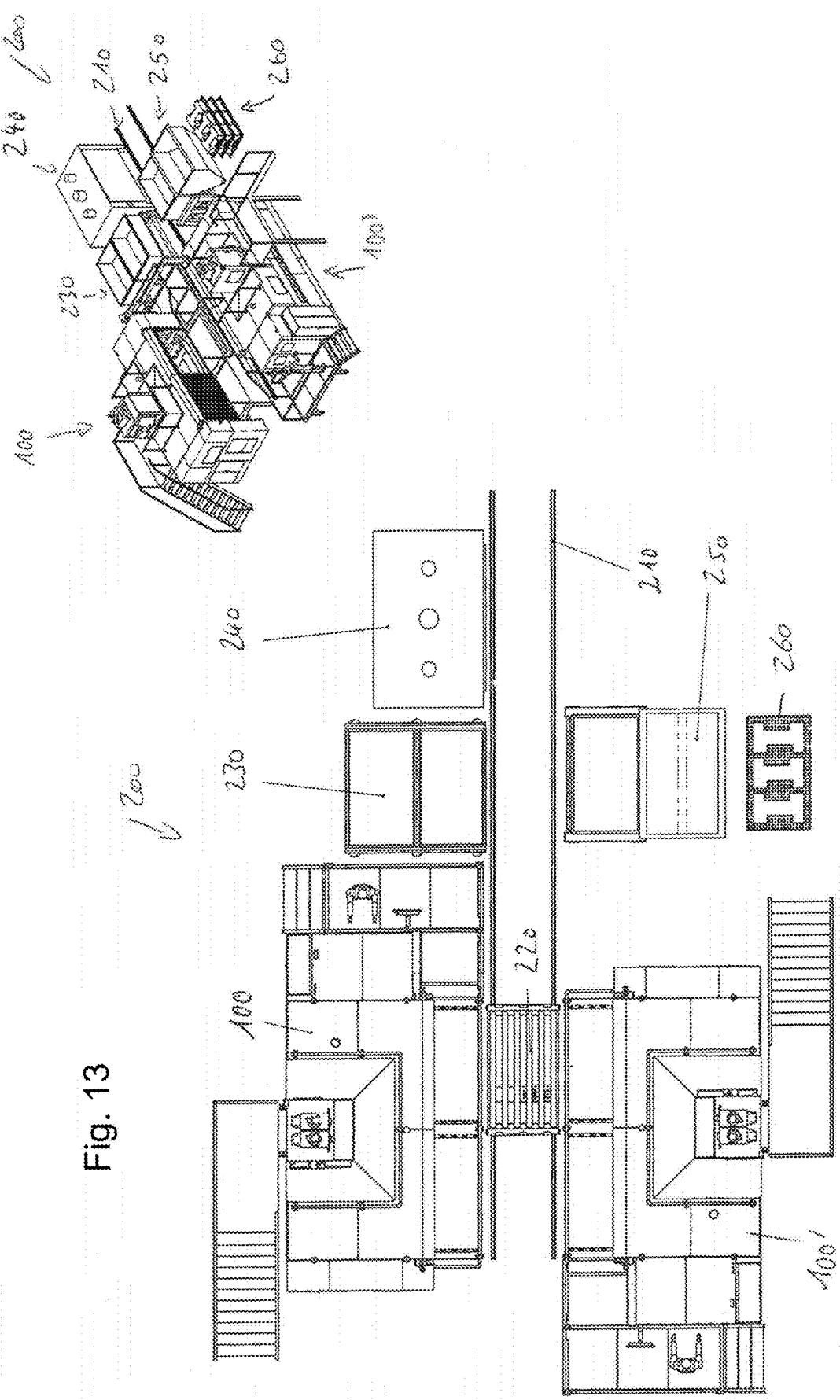

COATER ARRANGEMENT FOR A 3D PRINTER

BACKGROUND OF THE INVENTION

(1) Field of the Invention

The present invention relates to a coating device arrangement for a 3D printer and to a 3D printer having such a coating device arrangement.

(2) Description of the Related Art Including Information Disclosed Under 37 CFR 1.97 and 1.98

Various generative manufacturing processes (and consequently various types of 3D printers) are known.

Some generative manufacturing processes have the following steps in common:

(1) First, particulate material is applied over the entire surface of a construction field, so as to form a layer of unsolidified particulate material.

(2) The applied layer of unsolidified particulate material is selectively solidified in a predetermined partial area, for example by selectively printing a treatment agent, for example a binder (alternatively, for example, by laser sintering).

(3) Steps (1) and (2) are repeated to manufacture a desired component. For this purpose, a construction platform on which the component is built up in layers may, for example, be lowered by respectively one layer thickness before a new layer is applied over the entire surface (alternatively, for example, the coating device and the printing device may be raised by respectively one layer thickness).

(4) Finally, the manufactured component which is supported and surrounded by loose, unsolidified particulate material may be unpacked.

The construction space in which the component or the components is/are manufactured may, for example, be defined by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may at least contribute to forming the construction space. An upper area of the construction space may, for example, be referred to as construction field. An example of such a construction box is, for example, described in DE 10 2009 056 696 A1.

A coating device arrangement having a coating device (also referred to as a "recoater") is normally used in the above step (1). Various coating device arrangements are known for use in 3D printers, by means of which a particulate construction material may be applied to the construction field (also referred to as construction surface or construction area) in the form of an even layer over the entire surface.

One type of coating device arrangement uses a roller (short: "roller coating device") in front of which first an amount of particulate construction material is put down and which is then horizontally moved across the construction field to apply the particulate construction material in the form of an even layer onto the construction field. In this respect, the roller may be rotated opposite to a running direction. Coating device arrangements with great lengths are difficult to realize using a roller coating device.

Another kind of coating device arrangement (a so-called coating device arrangement having a "container coating device", for example a "slot coating device") uses a coating device with a container which is, for example, displaceable across a construction field and defines an inner cavity for receiving particulate construction material which leads to an opening for outputting the particulate construction material onto the construction field. The coating device may be elongate, for example to span or to cover the length or width of a rectangular construction field. The opening may then be provided as a longitudinal slot. The coating device can thus be moved horizontally across the construction field and at the same time dispense/output particulate construction material from the opening onto the construction field to thereby apply an even layer over the entire surface of the construction field.

In the above step (2), a printing device having a print head may for example be used, which applies a treatment agent in a controlled way onto a subarea of the construction material layer applied before. The treatment agent contributes to an (immediate and/or subsequent) solidification of the construction material layer in the subarea. For example, the treatment agent may be a binder, for example a binder component of a multicomponent binder.

Alternatively, a laser may, for example, be used in the above step (2) to solidify a subarea of the construction material layer applied previously, for example by sintering or melting the construction material in the subarea.

The present invention relates to a coating device arrangement of the second type, briefly a coating device arrangement having a "container coating device", for example a "slot coating device".

Coating devices of this type may, for example, be provided with a vibration device by means of which the particulate material may be vibrated to influence, for example to support, the flow or trickle behavior of the particulate construction material or the discharge of the particulate construction material from the opening. A vibration device of this type may, for example, be formed by a shaking device by means of which at least a wall portion of the container is vibrated or rather exposed to a shaking motion to influence the discharge of the particulate construction material.

In addition, coating device arrangements of this type may, for example, be provided with a labyrinth structure inside the container, which may prevent the construction material from flowing out/escaping when the coating device stands still.

Moreover, coating device arrangements of this type may be provided with a stroking/sweeping member, by means of which particulate material applied to the construction field may be stroked to compress and/or level the construction material.

An example of a coating device arrangement having a "slot coating device" is known from DE 10 2009 056 689 A1. See therein, for example, FIGS. 17 to 20.

WO 95/18715 A1 discloses a method and a device for manufacturing a three-dimensional object, wherein a shiftable container used for applying a material in powder or paste form is provided with vibrating wiping members on its lower side, to improve the adjustment of the layer thickness of the applied material. DE 10216013 A1 discloses a method and a device for applying fluids, the fluid being applied onto an area to be coated in front of a blade and the blade being displaced over the applied fluid thereafter, the blade performing a vibration to allow for a better distribution of the applied fluid.

It may be considered as a problem underlying the invention to provide a coating device arrangement for a 3D printer including a "container coating device", which has an extended scope of application.

BRIEF SUMMARY OF THE INVENTION

The present invention provides a coating device arrangement for a 3D printer according to claim 1. Further embodiments of the coating device arrangement are described in dependent claims 2 to 13. Claim 14 describes a 3D printer including a corresponding coating device arrangement.

According to various embodiments, a coating device arrangement may be provided by way of illustration, in which particulate construction materials of various compositions can reliably be applied onto a construction field in even layers. For example, even a particulate construction material having a poor trickle or flow behavior can be applied onto a construction field in even layers according to various embodiments. For example, a particulate construction material having a poor trickle or flow behavior can be vibrated appropriately using a vibration device, and/or a wall portion of a container receiving the construction material can be exposed to an appropriate shaking motion using a shaking device according to various embodiments, without substantially affecting the function of one or more other components of the coating device and/or without substantially compromising the quality of the applied layer, for example by formation of so-called waves in the applied construction material layer, which may, for example, be caused by an oscillating/vibrating wiping member. According to various embodiments, by way of illustration, the container and/or the construction material received therein may be "isolated" or rather shaking motion-decoupled and/or vibration motion-decoupled from one or more other components of the coating device arrangement (for example the stroking member and/or the closing member and/or the charging container), so that a wall portion of a container receiving the construction material can be exposed to an appropriate shaking motion and/or the construction material received in the container can be exposed to an appropriate vibration, substantially without having to consider the function of one or more other components and/or substantially without affecting the applied layer's quality.

In this respect, particulate construction material within the meaning of this application may be understood as a construction material comprising at least one kind of particulate material (for example (grains of) sand, for example foundry sand, and/or metal particles and/or particles of synthetic material). Various types of particulate material may be included in the construction material as well, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. In case that the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core, a construction material composition specifically prepared for this purpose may be used. In this respect, the construction material composition may be defined by the number of components used as well as by the respective type and the respective share of components contained in the construction material (mixture). In this respect, the trickle or flow behavior of the construction material may vary considerably depending on the construction material composition.

According to various embodiments, a coating device arrangement for a 3D printer may comprise:

a coating device having a carrier structure and a container fixed to the carrier structure, which defines an inner cavity for receiving particulate construction material, which leads to an opening for outputting the particulate construction material (for example onto/in a construction field or onto/in a construction space), a vibration device configured to vibrate particulate construction material received in the container and thereby to influence (for example to promote and/or to favor) the discharge/output of construction material from the opening, and a stroking member attached to the coating device, configured to stroke particulate construction material output from the opening, to thereby level and/or compress the output particulate material, and/or a closing device configured to selectively close the opening and comprising a closing member attached to the coating device, wherein the stroking member and/or the closing member are attached to the carrier structure in a way to be vibration-decoupled from the vibration generated by the vibration device in the container.

According to various embodiments, a coating device arrangement for a 3D printer may comprise:

a coating device having a carrier structure and a container fixed to the carrier structure, which defines an inner cavity for receiving particulate construction material, which leads to an opening for outputting the particulate construction material, a shaking device configured to expose a wall portion of the container to a shaking motion and to thereby influence (for example to promote and/or to favor) the discharge of construction material from the opening, and a stroking member attached to the coating device, configured to stroke particulate construction material output from the opening to thereby level and/or compress the output particulate material, and/or a closing device configured to selectively close the opening and comprising a closing member attached to the coating device, wherein the stroking member and/or the closing member is/are fixed to the carrier structure to be shaking motion-decoupled from the wall portion of the container.

In this respect, the shaking device may, for example, form the above-mentioned vibration device or may, for example, replace the above-mentioned vibration device.

Alternatively, the vibration device may, for example, be configured to vibrate particulate construction material received in the container by blowing a fluid (for example a pressure fluid, for example pressure gas, for example pressurized air) and/or by means of applying ultrasonic waves. Thus, the vibration device may, for example, be formed as a shaking device, for example as an eccentric device as described later. Alternatively, the vibration device may, for example, be an ultrasonic device, by means of which the construction material and/or a container wall portion can be stimulated and consequently vibrated, or a blowing device which blows a fluid against the construction material, thereby vibrating the construction material.

Thus, in the above-mentioned embodiments, at least one of the stroking member and the closing member may be attached to the carrier structure of the coating device in a way to be respectively vibration-decoupled or shaking motion-decoupled, so that the construction material and/or a wall portion of the container can be vibrated appropriately or can be exposed to an appropriate shaking motion, substantially without affecting the function of the closing device and/or substantially without compromising the applied layer's quality.

The coating device may, for example, be displaceable in a horizontal direction, for example across a construction field. For example, the coating device may be displaceable along a linear guiding structure for this purpose, for example by means of a slide to which the coating device is fixed.

The container may for example be formed to be elongate, the longitudinal axis extending for example in the horizontal direction perpendicular to the direction in which the coating device is displaceable. In this respect, the opening may for example be formed as a longitudinal slot, the longitudinal axis of which extends in the horizontal direction, which is perpendicular to the direction in which the coating device is displaceable.

The container may, for example, taper downwards in cross section and may, for example, be funnel-shaped in cross section.

The container may, for example, be open in an upward direction.

The opening or the longitudinal slot may, for example, be located at a lower end portion of the container, i.e., for example, at the end portion of the coating device facing the construction field, and may, for example, be directed downward toward the construction field.

The (first) wall portion of the container may, for example, be located in a cross direction on a first side, and may be opposite a second/another wall portion. The (first) wall portion may, for example, be formed by a first container side wall extending in a longitudinal direction, which in a cross direction is located opposite a second/another container side wall.

The carrier structure may, for example, extend in the horizontal direction which is perpendicular to the direction in which the coating device is displaceable and/or which is parallel to the longitudinal direction of the container. The carrier structure may, for example, be substantially stiff/rigid. The carrier structure may, for example, comprise one or more carriers which with their longitudinal axis extend in the horizontal direction that is perpendicular to the direction in which the coating device is displaceable and/or that is parallel to the longitudinal direction of the container. For example, the container may be attached (in a cross direction) to a first carrier on a first side and to a second carrier on an opposite second side. For example, the container may be connected (in a cross direction) to the carrier structure by means of a damping device on a first side and by means of the shaking device on a second side, for example to the first carrier and the second carrier, respectively.

The construction field may, for example, be defined by a construction platform and/or construction box (also referred to as "job box"), above or in which a component is/can be constructed by means of a 3D printer in a generative manufacturing process. The construction box may, for example, receive a height-adjustable construction platform which is gradually lowered during the generative manufacturing process (or, as the case may be, during a so-called "construction job"). The drive for the height adjustment may, for example, be provided either directly in the construction box ("travelling along") or, for example, in a stationary way ("installation-fixed") in the 3D printer. The construction box may, for example, be displaceable out of or into the 3D printer, for example through a roller conveyor and/or through its own travel drive integrated in the construction box. The construction box may, for example, be provided as described initially, for example as described in DE 10 2009 056 696 A1.

The stroking/sweeping member attached to the coating device may, for example, form a stroking surface and be configured to stroke particulate construction material output from the opening (for example onto the construction field) using the stroking surface, to thereby level and/or compress the output particulate material. The stroking surface may, for example, be substantially planar. The stroking surface may, for example, be directed in a downward direction (for example toward the construction field). For example, the stroking member may have an elongate shape which may, for example, extend substantially parallel to the longitudinal direction of the container, for example along the slot thereof. For example, the stroking member may be formed as a stroking bar/strip and/or as a stroking blade. For example, the stroking member may be made of metal, for example of steel.

The stroking member may, for example, be disposed underneath the opening, for example in a vertical direction below the opening, for example at a (small) vertical distance to the opening. In other words, the stroking member may be disposed outside or underneath the container.

The stroking member may, for example, be arranged laterally next to the opening in a horizontal direction.

The stroking member may, for example, be fixed to the carrier structure to be shaking motion-decoupled from the entire container.

According to various embodiments, the coating device arrangement may comprise a first and a second stroking member which are fixed to the carrier structure to be respectively shaking motion-decoupled from the wall portion of the container (for example from the entire container) and/or vibration-decoupled from the vibration generated by means of the vibration device in the container. Hereby, the coating device can be operated as a bidirectional coating device.

The information provided above for the one/first stroking member applies analogously to the second stroking member.

The first and second stroking members may, for example, face each other in a cross direction of the coating device, and, for example, may be disposed on opposite sides of the opening. For example, the first and second stroking members may be fixed to the carrier structure separately from each other. For example, the first stroking member may be fixed to the first carrier and the second stroking member may be fixed to the second carrier, for example through one or more ribs of the carrier structure and an optional ledge/bar.

The closing member attached to the coating device may, for example, be elongate in shape. The longitudinal axis of the closing member may, for example, extend substantially parallel to the longitudinal direction of the slot. The length of the closing member may, for example, be greater than or equal to the length of the opening and the slot, respectively.

The closing member may, for example, selectively cover the opening at least in part, for example as a result of a lateral movement and/or displacement (for example a lateral expansion). The lateral movement and/or displacement may, for example, take place toward the opening.

The closing member may, for example substantially in a horizontal direction, for example perpendicular to its longitudinal axis and/or perpendicular to an imaginary vertical line/plane extending through the opening or slot, be displaceable and/or deformable and/or expandable, for example toward the vertical line/plane.

According to various embodiments, the (at least one) closing member may, for example, comprise a sealing surface configured to seal on a counter surface in a closing state of the closing device, the sealing surface being made of a flexible material. Hereby, the opening or slot can be closed reliably, for example when/because the flexible material can adapt to the contour of the counter surface (including construction material particles locked therebetween). The flexible material may, for example, be an elastomer and/or silicone. The counter surface may, for example, be formed by a stationary counter surface or another closing member which is arranged on the other side of the opening.

According to various embodiments, the (at least one) closing member may, for example, be formed by a hollow body (for example an elongate hollow body), the inner cavity of which is delimited by a deformable portion which is deformable outwards (starting from the inner cavity) by a pressure fluid introduced in the hollow body, thereby expanding the inner cavity (for example substantially perpendicular to the longitudinal axis of the hollow body and/or to the above-described imaginary vertical line/plane through the opening or slot), to thereby cover the opening at least in part. The hollow body may, for example, comprise an expansion portion formed by the deformable portion, where the hollow body can be deformed specifically. The deformable portion or expansion portion may, for example, extend along the entire longitudinal extension of the slot and/or the elongate hollow body. The elongate hollow body or at least the deformable portion thereof may, for example, be made of an elastomer and/or silicone material.

Even if the closing member has proven its worth in practice in the form of a (for example elongate) hollow body (including an embodiment with two hollow bodies), the closing member is not limited to this embodiment. Alternatively, for example, one or more horizontally movable sliders/slide valves may be used as closing member(s). However, the closing member in the form of a hollow body can easily be integrated in the coating device and can, in addition, allow for a reliable closing of the slot.

The closing member may, for example, be located underneath the opening, for example in a vertical direction underneath the opening, for example at a (little) vertical distance to the opening. In other words, the closing member may, for example, be disposed outside or underneath the container.

In a horizontal direction, the closing member may, for example, be arranged laterally next to the opening.

The closing member may, for example, be fixed to the carrier structure while being shaking motion-decoupled from the entire container.

According to various embodiments, the closing device may, for example, comprise a first and second (for example elongate) hollow body (forming first and second closing members), each of the two hollow bodies having an inner cavity limited by a deformable portion, both hollow bodies being arranged on opposite sides of the opening (in a coating device cross direction) in such a way that the deformable portions face each other, the deformable portions being configured to be deformed outward by a pressure fluid supplied to the associated hollow body, thereby expanding the inner cavity, so that both deformable portions may be moved toward each other and may be contacted to thereby close the opening.

According to various embodiments, the (respective) deformable portion may be concavely/inwardly curved (thereby, for example, forming a portion projecting into the cavity) with the coating device opening being released/uncovered (for example in an unloaded state or in a state in which there is no charge with pressure fluid), and may be curved outwardly by a pressure fluid supplied to the (respective) hollow body to close the opening.

According to various embodiments, the closing device may, for example, further comprise a fluid line structure through which the (respective) hollow body can be brought into fluid connection with a pressure fluid source.

The pressure fluid source may, for example, be configured to selectively supply the hollow body with pressure fluid through the fluid line structure.

The fluid line structure may, for example, comprise a hose line structure (for example comprising one or more hoses) which is connected to the (respective) hollow body to supply the hollow body with pressure fluid. The hose line structure may, for example, be configured as a drag hose line structure and may, for example, be integrated in a drag chain which, for example, additionally supplies the coating device (for example one or more drives of the coating device) with electric current by means of one or more trailing cables.

The pressure fluid source may, for example, be a pressure air source. For example, the pressure fluid source may comprise a pressure vessel, an optional pressure reducer and an armature (for example a valve). The pressure vessel may, for example, be a stationary pressure vessel, i.e. a pressure vessel which does not travel along with the coating device. The armature provided for example on the pressure vessel or between the pressure vessel and the coating device on the fluid line structure may, for example, be closed or opened by a control unit (for example by the control unit as described later) through a drive connected to the armature, to thereby selectively provide the hollow body with pressure fluid to thereby close the opening.

According to various embodiments, the closing device may further comprise a control unit (for example a "controller" or an electronic control unit) configured to selectively close the opening in a controlled way by means of the at least one closing member (for example by means of a controlled deformation and/or movement of the closing member).

For example, the control unit may be connected to the above-mentioned pressure fluid source (for example to the armature thereof) and may be configured to control the pressure fluid source to close the opening in such a way that the pressure fluid source supplies the hollow body with pressure fluid to deform it on its deformable portion.

The stroking member and the closing member may, for example be firmly connected and/or may be fixed to the carrier structure together, for example may be suspended therefrom together. For example, the stroking member may be arranged underneath the closing member, i.e., the at least one closing member may, for example, be arranged in a vertical direction between the opening and the at least one stroking member. For example, the closing member may be attached on an upper side (a side averted from the construction field) of the stroking member, for example be supported thereby.

According to various embodiments, the coating device may comprise a first and a second closing member which are fixed to the carrier structure to be respectively shaking motion-decoupled from the wall portion of the container (for example the entire container) and/or vibration-decoupled from the vibration generated in the container by means of the vibration device.

The information provided with respect to the one/first closing member applies analogously to the second stroking member.

The first and second closing members may face each other in a cross direction of the coating device, and may, for example, be arranged on opposite sides of the opening. For example, the first and second closing members may be fixed to the carrier structure separately. For example, the first closing member may be fixed to the first carrier and the second closing member may be fixed to the second carrier, for example, respectively via one or more ribs of the carrier structure and an optional ledge/bar.

According to various embodiments, the following may apply to the coating device arrangement:
the (respective) stroking member and/or the (respective) closing member may be fixed to the carrier structure in a substantially rigid way, and/or
the (respective) stroking member and/or the (respective) closing member may be fixed to the carrier structure separately from the wall portion of the container (for example by bypassing the wall portion and/or at different locations of the carrier structure), and/or
the (respective) stroking member and/or the (respective) closing member may be fixed to the carrier structure separately from the container (for example by bypassing the container and/or at different locations of the carrier structure), and/or
the (respective) stroking member and/or the (respective) closing member may be arranged at a vertical distance to the opening underneath the same, and/or
the (respective) stroking member and the (respective) closing member may be attached to the carrier structure together, i.e. the (respective) stroking member and the (respective) closing member may be fixed to the carrier structure together, arranged in a pair.

According to various embodiments, the (first) wall portion of the container may be attached to the carrier structure, for example to one of the carriers (for example the second carrier), for example through the shaking device.

According to various embodiments, the shaking device may, for example, be formed by an eccentric device. Alternatively, the shaking device may, for example, be formed by a linearly driven member or may comprise such a member which generates a shaking motion/a reciprocating motion that acts upon the wall portion of the container.

For example, the eccentric device may comprise:
a shaft rotatably fixed to the carrier structure,
an eccentric attached to the shaft, and
a connecting rod connected to the wall portion of the container.

For example, the shaft may, with its longitudinal axis, extend substantially parallel to the coating device longitudinal axis, and may for example, be rotatably attached to the carrier structure at several locations in a longitudinal direction.

For example, the eccentric device may comprise several eccentrics attached to the shaft, which are connected to the (first) wall portion of the container by a respective connecting rod at different locations (for example in a coating device longitudinal direction one after another).

According to various embodiments, another/a second wall portion of the container may, for example, be fixed to the carrier structure by means of a damping device, for example to the other one of the carriers (for example the first carrier).

The other/second wall portion of the container may, for example, be opposed to the one/first wall portion in a cross direction of the coating device, for example on an opposite side of the opening.

For example, the other/second wall portion of the container may be fixed to the carrier structure by several damping devices in a longitudinal direction of the coating device.

According to various embodiments, the (respective) damping device may, for example, comprise a damping part arranged between the carrier structure and the (other) wall portion, for example an elastic damping part.

For example, the damping part may be fixed to the carrier structure, the other wall portion being supported on the damping part via a flange structure (for example a projecting portion).

The damping part, for example the elastic damping part, may for example be made of a suitable damping polymer. For example, the damping part may have a cylinder shape and/or a prism shape, for example a solid/full cylinder shape and/or a solid/full prism shape.

According to various embodiments, the coating device arrangement may, for example, further comprise: a charging container arranged above the container to supply the container with construction material, and which is vibration-decoupled from the vibration generated by means of the vibration device in the container and/or shaking motion-decoupled from the wall portion of the container (for example the entire container).

The charging container may, for example, be formed by the carrier structure and/or may be fixed thereto, for example in a substantially rigid way. For example, a distributing device, for example a distributing worm may be received in the charging container.

According to various embodiments, the coating device arrangement may, for example, further comprise a control unit (for example a "controller" or an electronic control unit) configured to control the vibration device and/or shaking device in such a way to selectively vibrate the construction material or to selectively expose a wall portion of the container to a shaking motion. The control unit may, for example, be the same control unit or another control unit than that of the closing device.

For example, the control unit may control a rotary drive which puts the above-described shaft into rotary motion to generate the shaking motion.

For example, the control unit may be configured to control the shaking device and/or the vibration device in such a way that it selectively generates the shaking motion or vibration during a coating travel of the coating device.

For example, the control unit may be configured to control the shaking device and/or the vibration device depending on a construction material composition used, for example in accordance with a parameter or set of parameters stored in the control unit for the construction material composition. For example, various parameters or sets of parameters may be stored in the control unit for different construction material compositions.

According to various embodiments, a 3D printer (or a "3D printing installation") may, for example, comprise a coating device arrangement which is configured as described above.

For example, several 3D printers may form a 3D printer arrangement.

For example, the (respective) 3D printer may further comprise:

a printing device for the selective and controlled output of a treatment agent, which is configured to print the treatment agent on a predetermined subarea of a previously applied construction material layer (the treatment agent dispensed by means of the printing device contributes to a selective solidification and may, for example, be a binder component of a multicomponent binder, another binder component being included in or added to the construction material); and/or a feeding unit integrated in the 3D printer, by means of which construction material can be freshly prepared and fed to the coating device, and/or one or more construction platforms and/or construction boxes which define a respective construction field.

The printing device may, for example, be displaceable horizontally, for example in a direction perpendicular to the direction in which the at least one coating device is displaceable. The printing device may, for example, be configured to serve several construction fields. The printing device may, for example, be additionally displaceable in the direction in which the at least one coating device is displaceable as well, so that it can travel across the construction field or the construction fields in a meandering course, for example in the shape of a U.

Alternatively, a respective construction material layer may be selectively solidified, for example sintered, for example by means of a laser (so-called "selective laser sintering").

The feeding unit may, for example, comprise a mixing tank having a stirring unit as well as one or more storage containers from which a respective particulate material can be fed to the mixing tank. The mixing tank having a stirring unit as well as the one or more storage containers may, for example, be arranged in a vertical direction above the at least one construction field. Moreover, the mixing tank may, for example, be connected to a liquid container through a metering pump, from which a liquid component can be fed to the mixing tank. The mixing tank may, for example, have a dispensing shaft through which the coating device can be filled with freshly prepared construction material when moved to a filling position.

Exemplary but non-limiting embodiments of the invention are shown in the Figures and are hereinafter described in detail.

BRIEF DESCRIPTION OF THE SEVERAL VIEWS OF THE DRAWINGS

FIGS. 13 and 14 show a top view and a perspective view from above, respectively, of a 3D printer arrangement including a first and a second 3D printer.

DETAILED DESCRIPTION OF THE INVENTION

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figures. As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of the present invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate.

Figure 1:
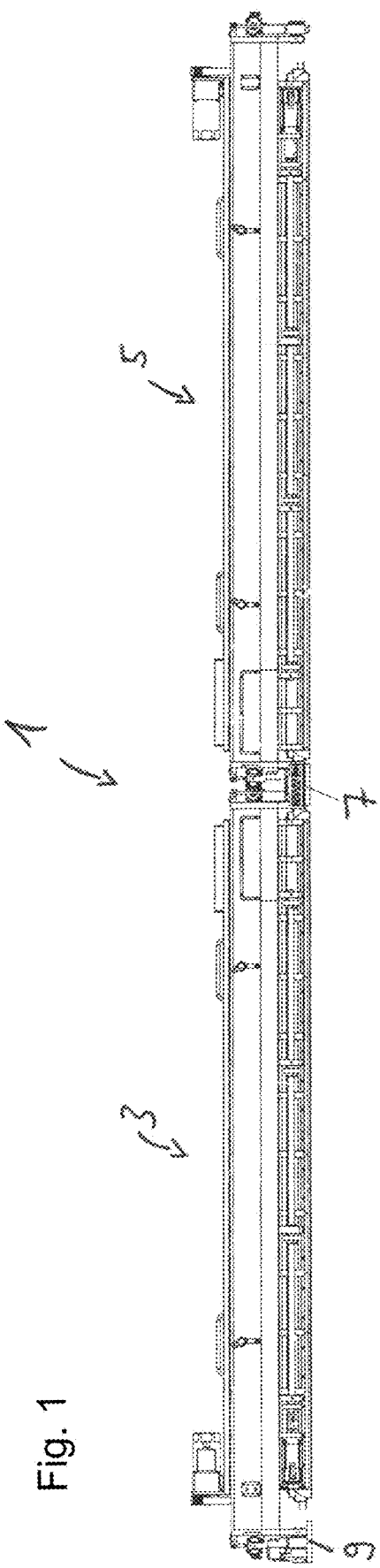
FIG. 1 shows a lateral view of a coating device arrangement according to an embodiment of the invention.

FIG. 1 shows a side view of a coating device arrangement 1 according to a first embodiment of the invention.

By way of example, the coating device arrangement is here provided with two coating devices 3, 5. It shall be understood that the coating device arrangement 1 may alternatively be equipped with only one coating device 3 or with more coating devices, the features described below being applicable analogously, i.e. not being limited to a coating device arrangement having two coating devices.

The coating device arrangement 1 shown herein comprises a first coating device 3 and a second coating device 5. Hereinafter, mainly the first coating device 3 will be described and the features mentioned in this connection can be applied analogously to the second coating device 5.

The first coating device 3 and the second coating device 5 may, for example, be firmly connected through a base plate 7, so that they are displaceable together across a respective construction field. In the present case, each coating device is fixed to, for example supported by the base plate 7 at one of its front sides. On the other hand, the base plate 7 may be displaceable along a linear guiding structure (not shown) which would extend perpendicular to the drawing plane in FIG. 1.

In addition, the first coating device 3 may, for example, be attached to another base plate 9 by its other front side. On the other hand, the base plate 9 may be displaceable along another linear guiding structure (not shown either). The second coating device 5 may also be fixed to another base plate (not shown) on its other front side.

As shown in FIG. 1, both coating devices 3 and 5 may, for example, be formed to be elongate, the respective longitudinal axis extending perpendicular to the direction of movement. Moreover, both coating devices 3 and 5 may be arranged one after the other in a longitudinal direction.

Figure 2:
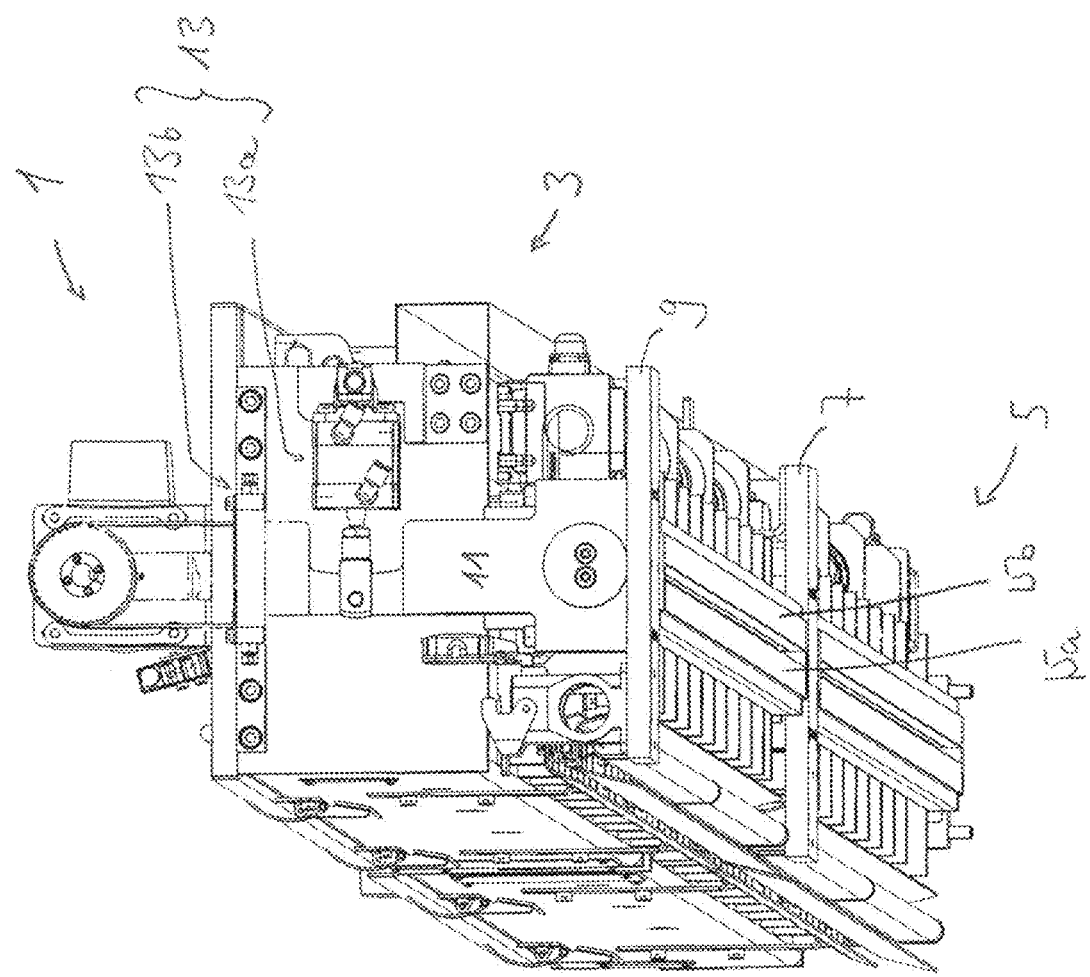
FIG. 2 shows a perspective view of a front side of the coating device arrangement according to FIG. 1.
Figure 3:
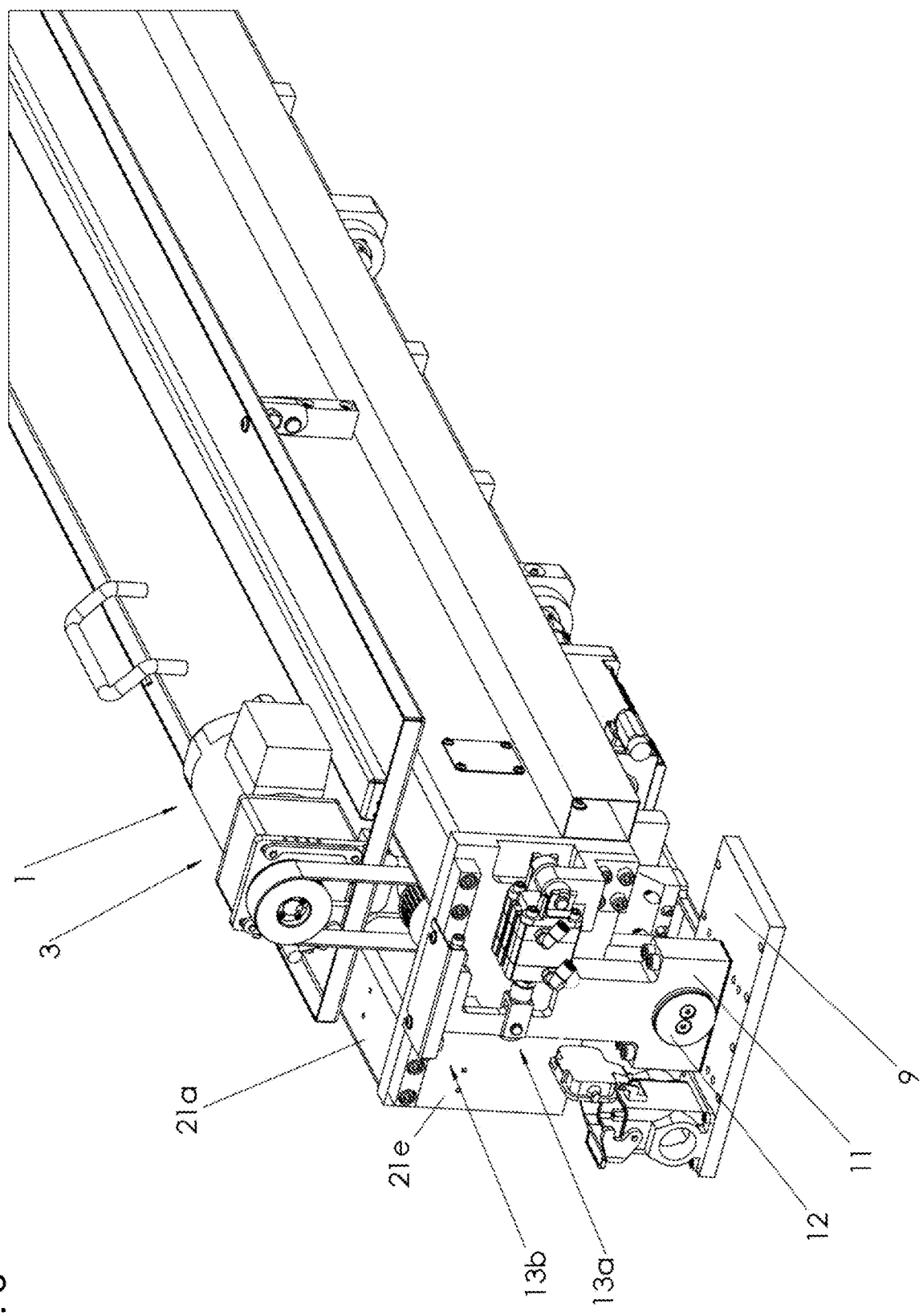
FIG. 3 shows another perspective view of the front side according to FIG. 2.
Figure 4:
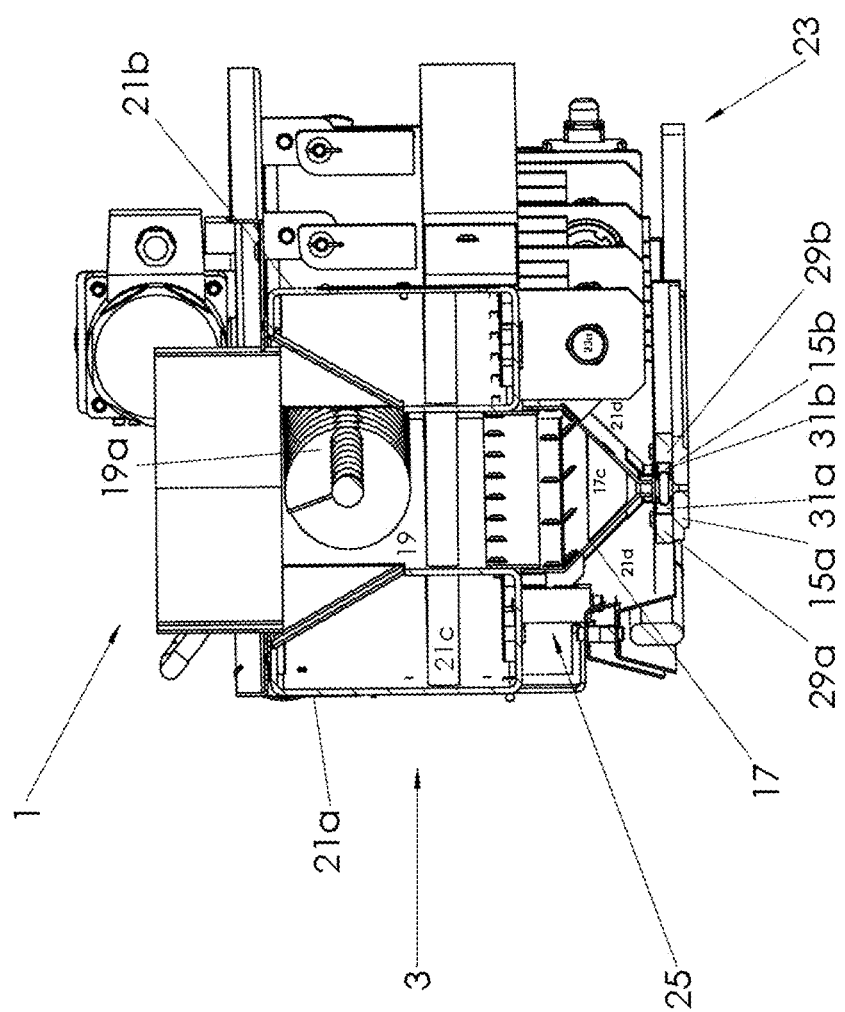
FIG. 4 shows a sectional perspective view of the coating device arrangement according to FIG. 1.
Figure 5:
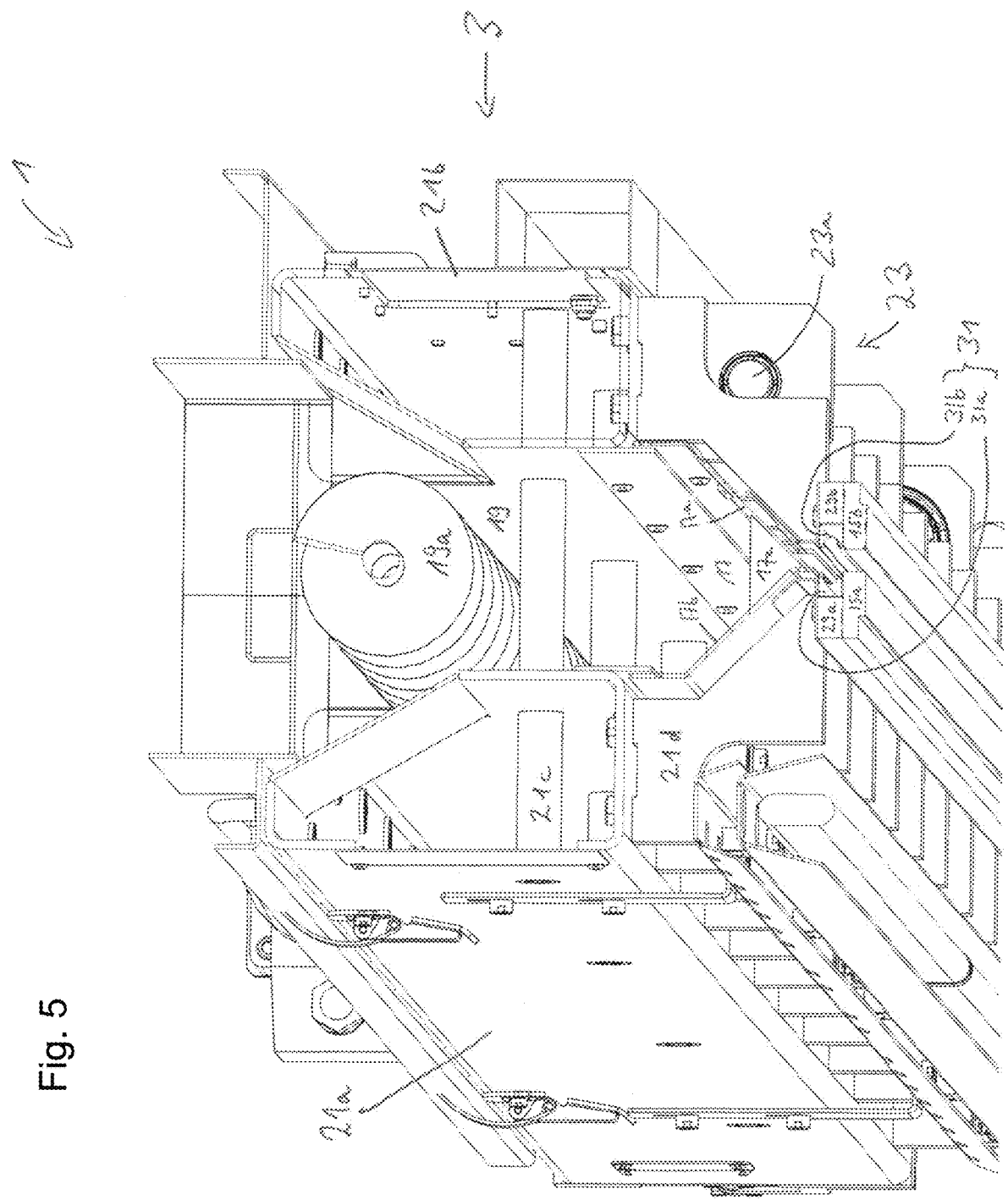
FIG. 5 shows a sectional perspective view of the coating device arrangement according to FIG. 1.
Figure 6:
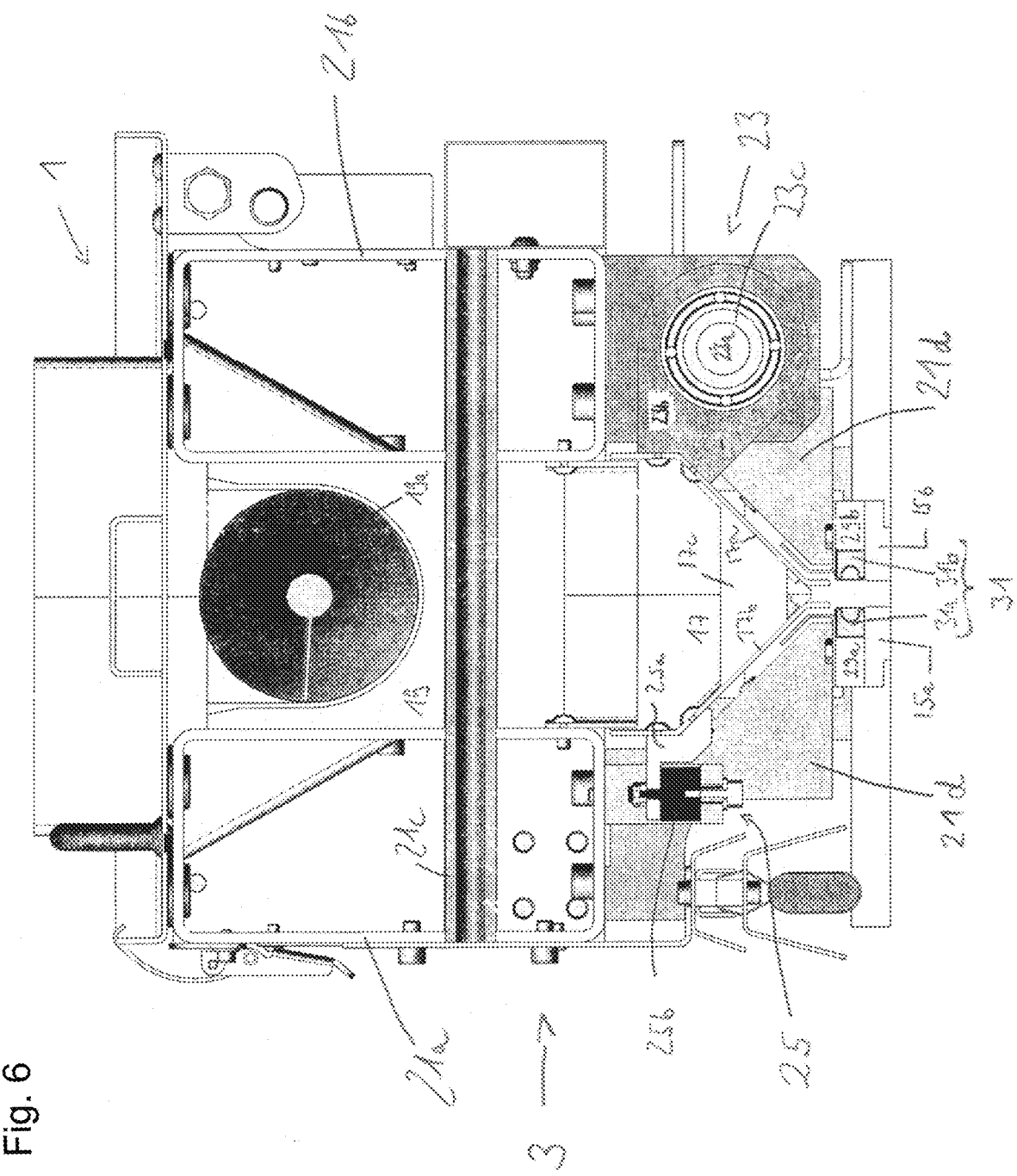
FIG. 6 shows a cross-sectional view through the coating device arrangement of FIG. 1 at a first longitudinal position.
Figure 7:
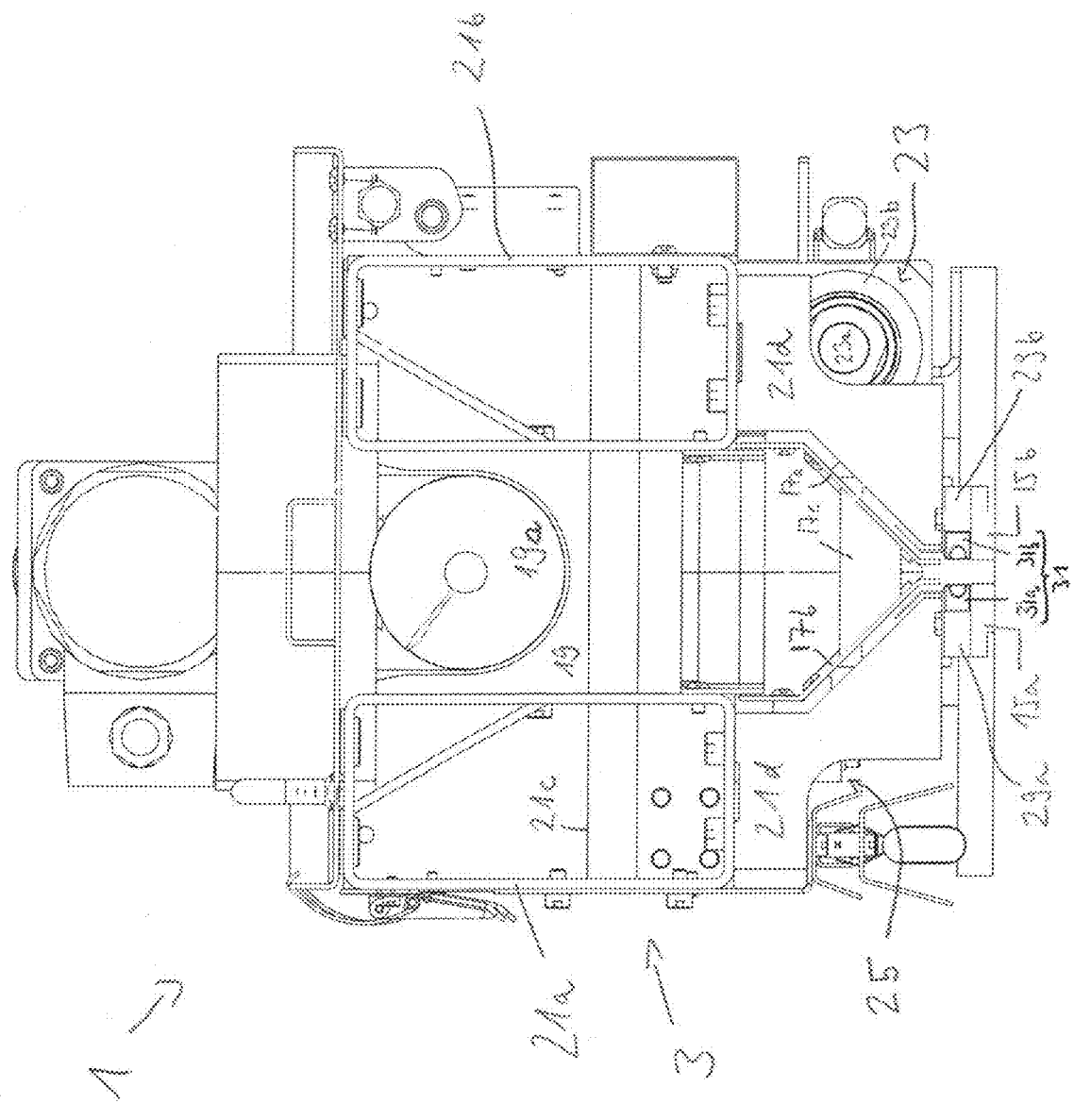
FIG. 7 shows a cross-sectional view through the coating device arrangement according to FIG. 1 at a second longitudinal position.

FIG. 2 and FIG. 3 each show a perspective view of a front side of the coating device arrangement according to FIG. 1.

As shown by FIGS. 2 and 3, the first coating device 3 may, for example, be attached to the base plate 9 through a bearing block 11 on its free front side facing away from the second coating device 5. Analogously, the coating device 3 may, for example, be fixed to the base plate 7 through another bearing block.

The coating device 3 may, for example, be pivotally mounted to the respective bearing block. This allows for a pivoting of the coating device 3 about a horizontal pivot axis which extends parallel to the longitudinal axis of the coating device 3 to set an angle of inclination of one or more stroking members 15a and 15b attached to the coating device 3 by means of a pivot device 13. By way of example, the pivot device 13 is here provided with a hydraulic drive 13a arranged between the bearing block and the coating device, and an electronically adjustable limit stop system 13b which variably limits the pivoting angle of the coating device to the right and to the left. In this respect, the coating device 3 may, for example, be pivoted in a first direction for a first travel ("journey") and in a second direction for a second travel ("return journey").

The stroking members 15a and 15b are, by way of example, provided as stroking ledges/bars and may, for example, be made of steel. The stroking members 15a and 15b may also be referred to as blades.

As shown in FIG. 2, the stroking members 15a and 15b form, for example, a downward oriented stroking surface which is substantially formed to be planar. A desired degree of compression of the particulate material can be set by setting the inclination angle of the respective stroking surface of the stroking members 15a and 15b. In this respect, the present coating device 3 is formed as a bidirectional coating device by way of example, which may coat in both directions, during a journey and during a return journey, and which may compress the output particulate material appropriately.

It shall be understood that the described coating device arrangement may also be formed as a unidirectional coating device arrangement, in which case one of the blades may be omitted. In addition, the coating device arrangement may also be configured without a pivotable coating device and/or without an adjustable blade angle.

As shown by FIGS. 4 to 7, the coating device 3 may, for example, comprise a first lower container 17, an (optional) second upper container 19 and a carrier structure.

The carrier structure may, for example, comprise one or more carriers 21a, 21b extending crosswise to the direction of movement or in a coating device longitudinal direction, which may be connected by several pipes or bars 21c in a transverse direction along the coating device longitudinal direction. As shown by FIG. 3, the carriers 21a, 21b may, for example, be connected to a connecting plate 21e on at least one of their front sides.

The first and second containers 17, 19 may, for example, each have an elongate shape.

By way of example, the first container 17 has a shape tapering downward in cross-section, for example a funnel shape. The first container 17 has a longitudinal slot (no reference number) at its lower end. The first container 17 may, for example, be open at its upper end, and may communicate with a lower, open end of the optional second container 19. For example, the first container 17 may be reinforced along the longitudinal direction by one or more reinforcing members 17c.

By way of example, the first container 17 is embodied as a shaking container, one side wall 17a (here the right side wall) of which may be exposed to a shaking movement by a shaking device 23 to vibrate particulate construction material received in the container 17.

By way of example, the first container 17 is here connected to the carrier structure 21b by the shaking device 23 on one side (here on the right side wall 17a), and is connected to the carrier structure 21a by a damping device 25 on the other side (here on the left side wall 17b). See for example FIG. 6.

Figure 10:
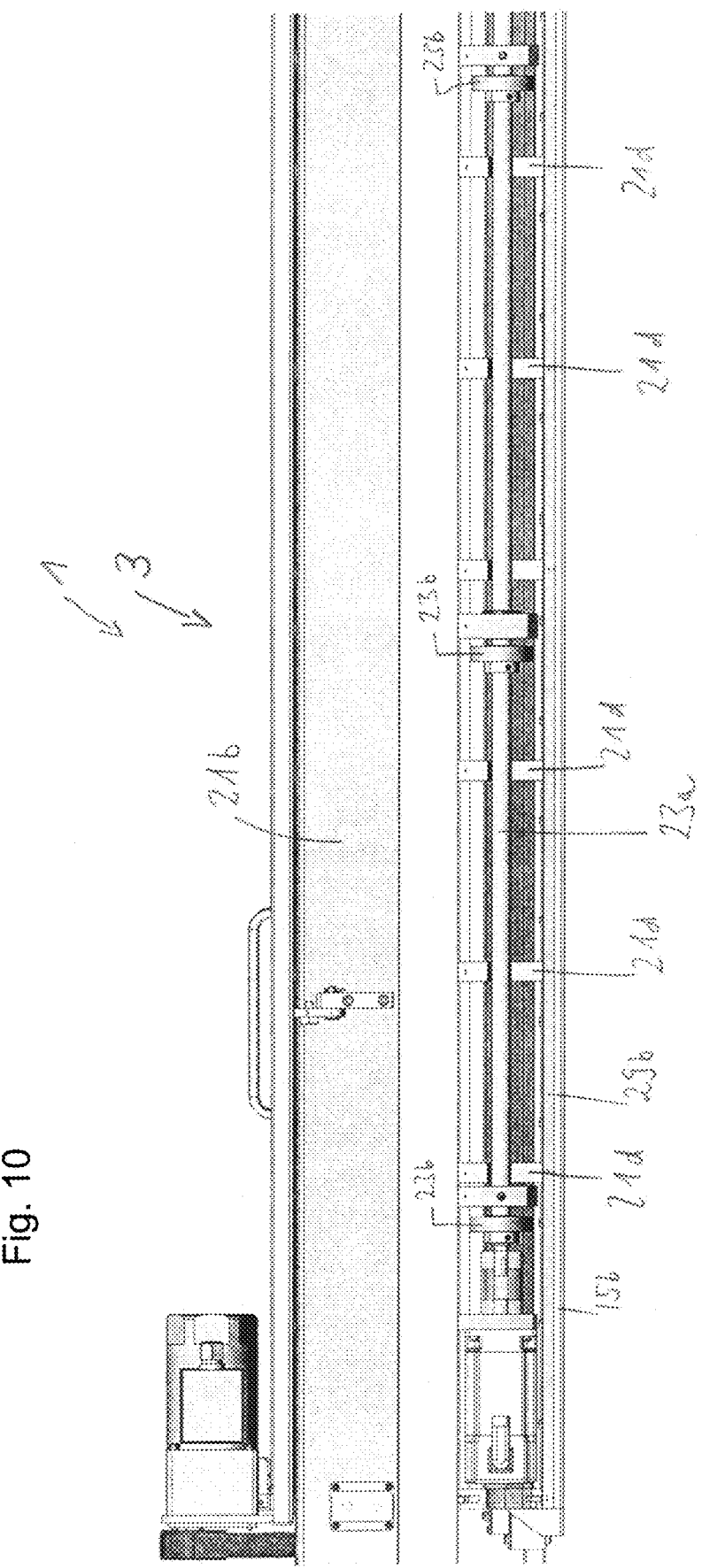
FIG. 10 shows an enlarged portion of the lateral view according to FIG. 1.

As shown, the shaking device 23 may, for example comprise a shaft 23a which is connected by an eccentric 23c to a connecting rod 23b, which is connected to one side of the first container 17. Several connecting rods 23b and/or eccentrics 23c may, for example, be provided one after another in a coating device longitudinal direction. See, for example, FIG. 10.

The damping device 25 may, for example, comprise a damping member 25b attached to the carrier structure 21a, as well as a projecting portion 25a which is connected to or formed by the other side of the first container 17 and is supported by the damping member 25b. For example, several damping devices 25 may be provided one after another in a coating device longitudinal direction, i.e. the first container may be connected to the carrier structure at several positions along the coating device longitudinal direction.

The (optional) second container 19 may, by way of example, have a rectangular shape in cross section. Here, the second container serves as a so-called charging container which provides the first container with construction material. A distributing member 19a, here a distributing worm may, for example, be received in the second container. The second container 19 may be rigidly connected to the carrier structure and/or may be formed/limited by the same.

In the exemplary embodiment shown, the first container 17 and the second container 19 are shaking motion-decoupled from each other.

As can further be seen from FIGS. 4 to 7 (also see FIG. 10), the carrier structure may, for example, comprise one or more ribs 21d along the coating device longitudinal direction on both sides of the container 17, which are connected to the carriers 21a and 21b, respectively, in a substantially rigid way, and to which the stroking members 15a and 15b are attached to be shaking motion-decoupled from the first container 17, for example in a substantially rigid manner, for example using a respective ledge/bar 29a and 29b, respectively, which is, for example, fixed to the rib by a respective intermediate part (without reference number).

Above the first stroking member 15 and below the longitudinal slot, i.e. between the first stroking member 15a and the first container 17, a first closing member 31a may, for example, be arranged. By way of example, this first closing member 31a is surrounded by an upper side of the first stroking member 15a in a downward direction and is, in addition, surrounded on a lateral side by the ledge 29a and, in an upward direction, by the intermediate part (without reference number). The first closing member 31a is exposed in a direction perpendicular to the longitudinal direction of the coating device 3 and perpendicular to an imaginary, vertical plane through the longitudinal slot.

Analogously, a second closing member 31b may be arranged above the second stroking member 15b and below the longitudinal slot, i.e. between the second stroking member 15b and the first container 17. This second closing member 31b is, by way of example, surrounded by an upper side of the second stroking member 15b in a downward direction and is, on a lateral side, surrounded by the ledge 29b and, in an upward direction, by the intermediate part (without reference number). The second closing member 31b is exposed in a direction perpendicular to the longitudinal direction of the coating device 3 and perpendicular to the imaginary vertical plane through the longitudinal slot.

The respective closing member 31a, 31b may, for example, be connected to the associated stroking member and/or the associated ledge and/or the associated intermediate part in a fixed way, for example by adhesion.

Both closing members 31a and 31b which are, for example, formed to be elongate, together form a closing device 31 which is configured to selectively close the opening of the container 17 for outputting the particulate construction material. In FIG. 4 to FIG. 7, the closing members 31a and 31b are shown in their respective open state.

The closing members 31a and 31b may selectively cover the opening in its respective closing state in part (for example following a lateral expansion of the respective closing member), so that the closing members 31a and 31b close the opening together.

Figure 8:
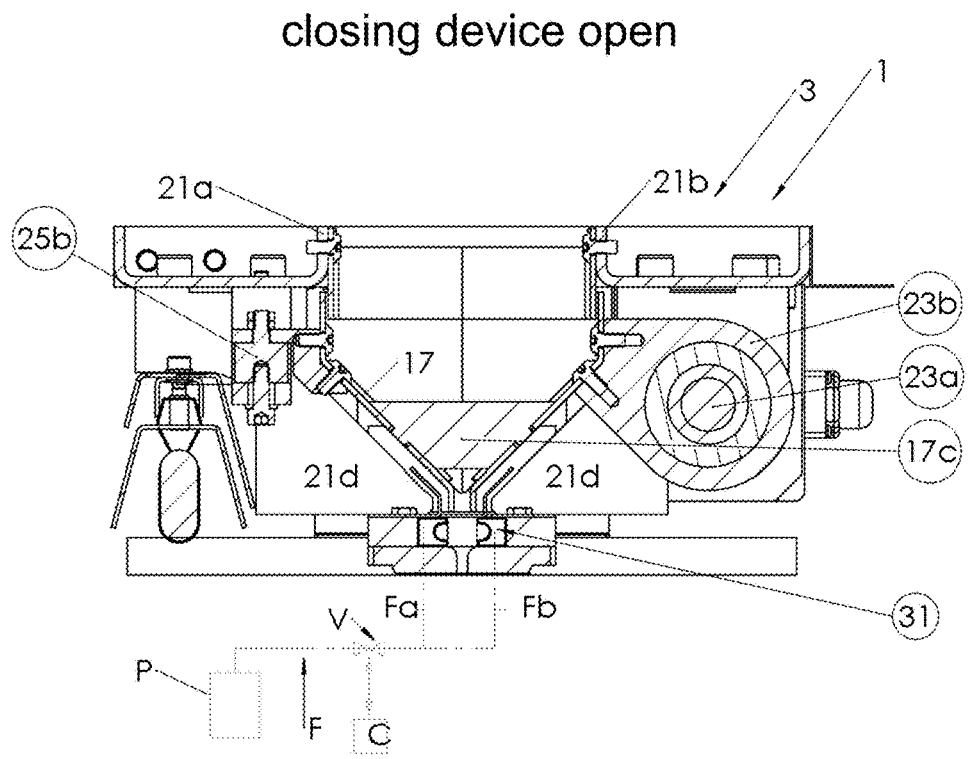
FIG. 8*a* shows another cross-sectional view through the coating device arrangement, the closing device being open.
FIG. 8*b* shows another cross-sectional view through the coating device arrangement, the closing device being closed.
Figure 8:
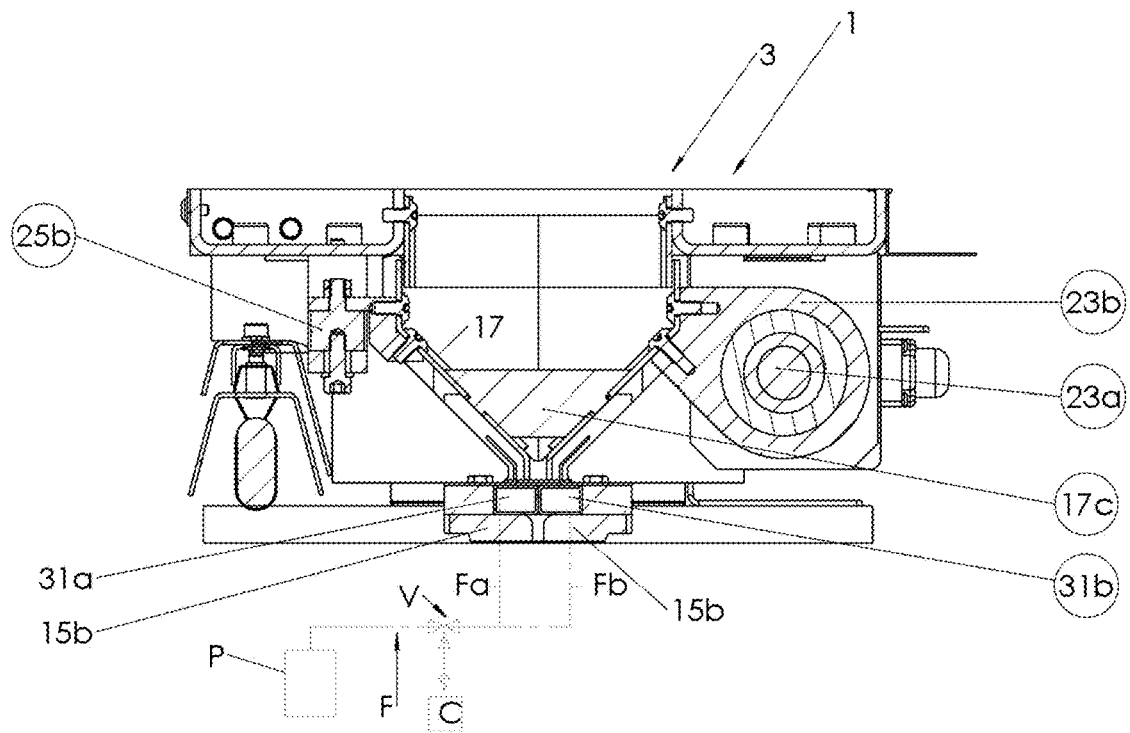
Figure 9:
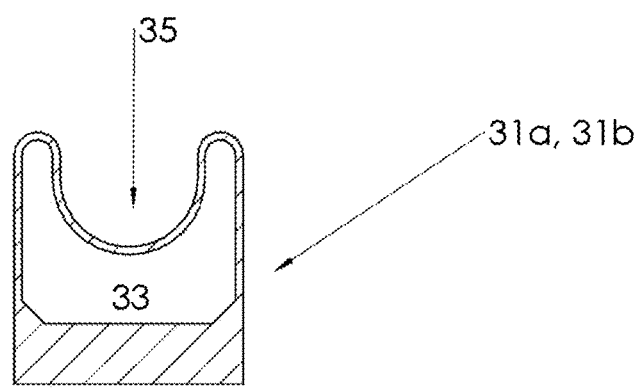
FIG. 9 shows a cross-sectional view through a closing member for use in a coating device arrangement according to the invention in an open state of the closing member.

As illustrated by FIGS. 8a, 8b and 9, the first closing member 31a and the second closing member 31b may, for example, comprise a first and a second hollow body, respectively, wherein each of the two hollow bodies has an inner cavity 33 (see FIG. 9) which is limited by a deformable portion 35, wherein the two hollow bodies are arranged on opposite sides of the opening in such a way (see FIG. 8a) that the deformable portions face each other, and wherein each of the two hollow bodies is configured to be deformed in an outward direction by an introduced pressure fluid at the deformable portion, thereby expanding the inner cavity, so that the two deformable portions may be moved toward each other and may be brought into contact with each other, to thereby close the opening (see FIG. 8b). As illustrated by FIG. 8b, each of the two closing members 31a, 31b partially covers the opening in this context. Here, the at least one closing member 31a, 31b or at least the deformable portion thereof is, by way of example, made of a flexible elastic silicone material and comprises a sealing surface configured to seal at a counter surface in a closing state of the closing device. In this respect, the sealing surface is formed at the deformable portion. According to the embodiment shown, the counter surface is also formed by a deformable portion.

As illustrated by FIGS. 8a, 8b and 9, the deformable portion 35 may, for example, be concave/inwardly curved with the opening being uncovered/released, and may be curved outwardly in a convex way by a pressure fluid supplied to the hollow body to close the opening.

As suggested by FIGS. 8a and 8b, the closing device 31 may, for example, further comprise a fluid line structure F (broken line) through which the respective closing member 31a, 31b is in fluid connection with a pressure fluid source.

The fluid line structure F may, for example, be formed as a hose line structure, for example as a drag hose line structure, at least in sections. The hose line structure may comprise a first and a second hose line Fa and Fb, respectively, wherein the respective hose line may, for example, be connected at a front side of the associated closing member 31a, 31b to the same.

Here, the pressure fluid source comprises, by way of example, a compressed air vessel P which is, for example, formed as a stationary vessel, and a valve V which may, for example, be mounted on the fluid line F between the compressed air vessel P and the closing members.

As further suggested by FIGS. 8a and 8b, the closing device 31 may, for example, further comprise a control unit C which is configured to selectively close the opening by means of the at least one closing member 31a, 31b in a controlled way.

In this respect, the control unit is exemplarily connected to the valve V and is configured to control it for closing the opening in such a way that the pressure fluid source feeds pressure fluid into the at least one hollow body 31a, so that it is deformed at its deformable portion 35 to thereby close the opening.

In this respect, in FIG. 8a the valve is closed (and consequently the closing device is opened), whereas in FIG. 8b the valve is open (and consequently the closing device is closed).

The control unit C may, for example, be configured to close the closing device 31 if the construction job assigned to the coating device 3 is finished and/or interrupted, and/or to close the closing device 31 of the coating device 3 at least temporarily during a coating-free travel and/or during a coating-free travel phase, for example during an advance and/or follow-up travel phase, and/or close the closing device 31 of the coating device in a standstill position of the coating device 3, and/or close the closing device 31 of the coating device 3 at least temporarily for cleaning the coating device.

The deformable portions may, for example, be formed by the above-described lateral free/exposed portion of the respective closing member.

A closing member configured in such a way may, for example, also be referred to as an inflatable sealing member, according to different embodiments.

It goes without saying that only one closing member 31a may be provided in an exemplary modification of the embodiment shown instead of the two closing members 31a and 31b, which one closing member 31 covers the opening entirely in the closed state of the closing device. Moreover, the closing device may as a further alternative comprise one or more slide valves/sliders.

It should be noted that the coating device arrangement shown in FIG. 1 may comprise a separate closing device for each of the coating devices 3 and 5, so that the opening of a respective coating device can be closed independently and selectively.

Further, in a case where the coating device 3 is provided together with the coating device 5, the coating device, the construction job of which is finished first may be closed by means of its associated closing device, for example at least until the construction job of the other coating device is finished.

Figure 11:
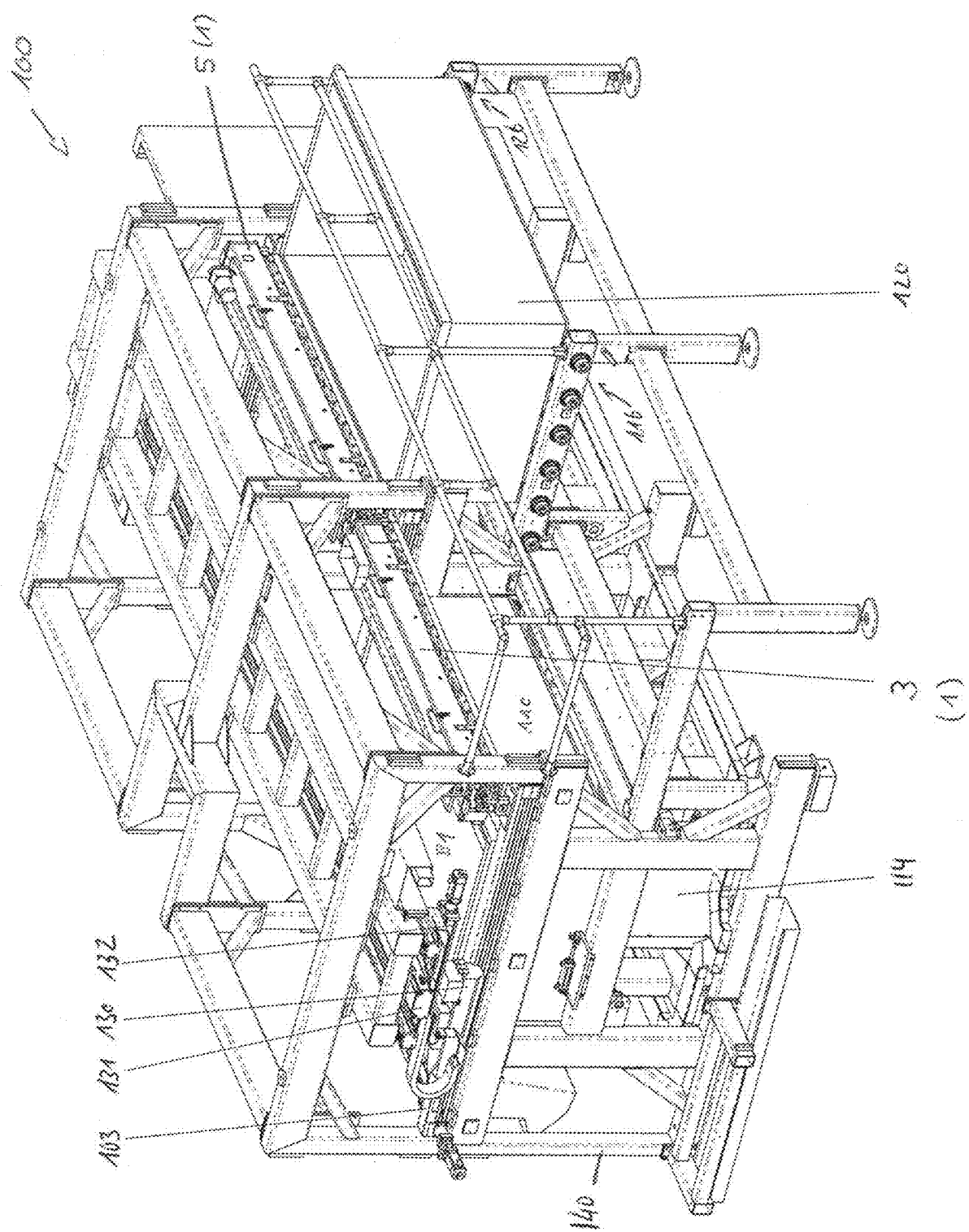
FIG. 11 shows a 3D printer according to an embodiment of the invention, the installation housing and the feeding unit having been omitted.

FIG. 11 shows a 3D printer 100 according to an embodiment of the invention, where the installation housing is not shown, so that the installation frame 140 can be seen.

As shown by FIG. 11, the above-described coating device arrangement 1 may, for example, be employed in a 3D printer 100. In this context, reference number 103 shows a linear guiding structure for the at least one coating device 3.

The 3D printer 100 may, for example, comprise a printing device having a print head 130 in addition to the coating device arrangement 1 (here by way of example comprising a first and a second coating device 3, 5), which is configured to print a treatment agent on a predetermined partial area of a previously applied layer of construction material.

The print head 130 may, for example, be displaceable horizontally, for example in a direction perpendicular to the direction in which the at least one coating device 3, 5 is displaceable, for example along a first print head linear guiding structure 131.

In this respect, the print head 130 may for example be configured to serve several (here two) construction fields.

The print head 130 may, for example, be additionally displaceable in the direction in which also the at least one coating device 3, 5 is displaceable, so that it may travel across the construction field or the construction fields altogether in a meandering course, for example in the shape of a U. For this purpose, the print head 130 may, for example, be displaceable along a second print head linear guiding structure 132.

As an alternative to the printing device, a respective construction material layer may, for example, be solidified selectively, for example sintered using a laser (so-called "selective laser sintering").

As illustrated by FIG. 11 (also see FIG. 12), the 3D printer 100 may, for example, comprise one or more construction areas B1 and B2 (here for example two) which are for example defined by a respective construction platform 112 (see FIG. 12) and/or a respective construction box 110 and 120, respectively, when the latter is located within the 3D printer in its construction position.

The respective construction platform 112 may, for example, be height-adjustable using an associated lift drive (here for example using a plant/installation-fixed lift drive 114).

As shown, the first construction box 110 may be displaceable for example through a first roller conveyor 116 into and out of the 3D printer, and the second construction box 120 may be displaceable for example through a second roller conveyor 126 into and out of the 3D printer.

Figure 12:
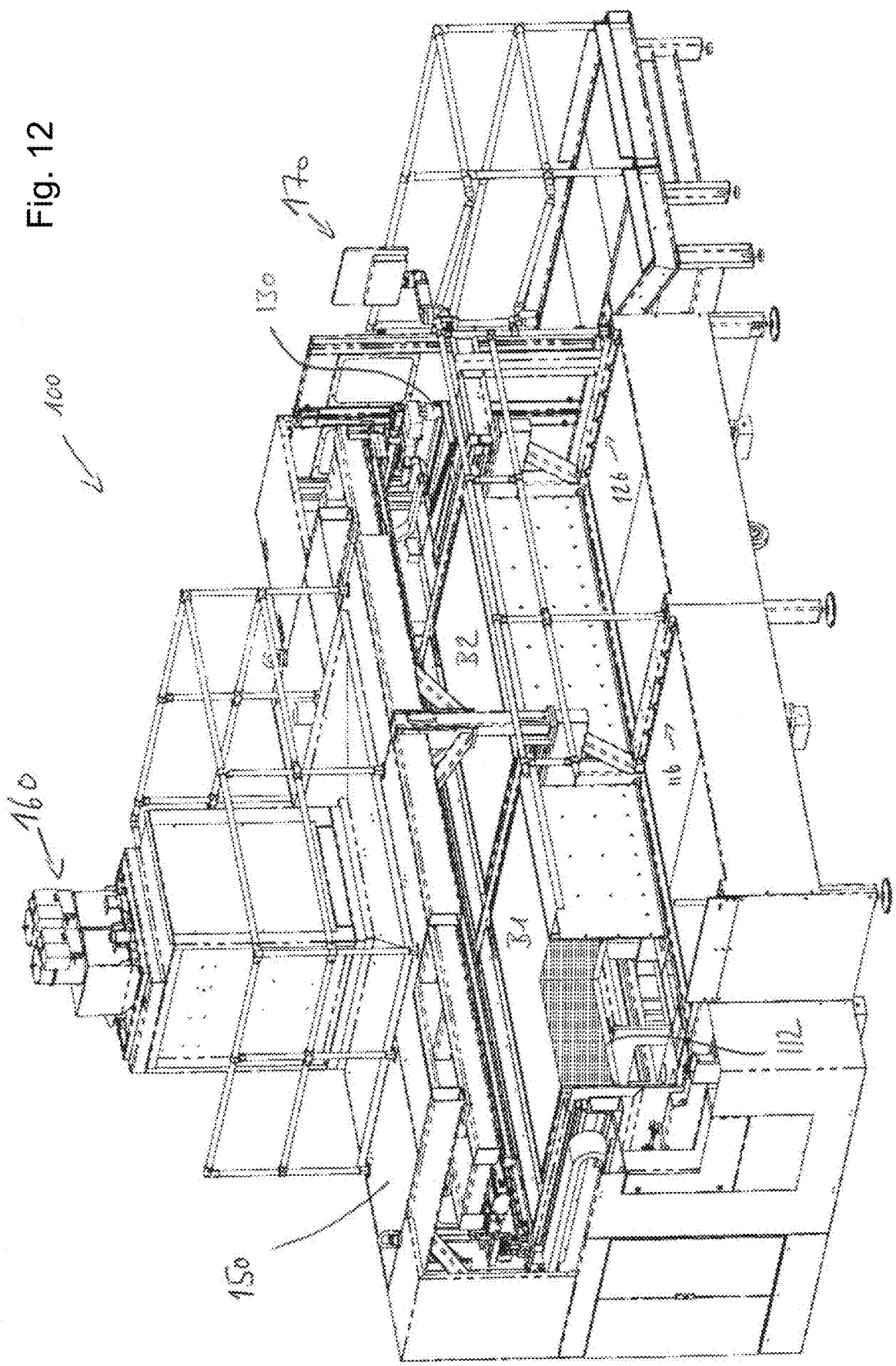
FIG. 12 shows the 3D printer according to FIG. 11, this time with a major part of the installation housing and the integrated feeding unit.

FIG. 12 shows the 3D printer 100 of FIG. 11, this time with a large part of the installation housing 150 and with an integrated coating device feeding unit 160.

As shown in FIG. 12, the 3D printer 100 may, for example, further comprise a coating device feeding unit 160 integrated in the 3D printer, by means of which construction material can be freshly prepared and fed into the (respective) coating device.

Two storage containers are illustrated, which store a respective particulate material and may feed the latter in a dosed manner into a mixing tank having a stirring unit which is not shown.

A part of the installation housing 150 and of the first construction box 100 is omitted in FIG. 12 to make the construction platform 112 and the stack of construction material layers arranged thereon visible.

The coating devices 3, 5 are displaced backwards in FIG. 12, and the print head 130 is located in the front on the right-hand side.

FIG. 12 further shows how a first construction area B1 and a second construction area B2 are respectively formed by the first construction box and the second construction box in the 3D printer.

Reference number 170 shows a common operating station.

Reference numbers 116 and 126 indicate a respective feeding device, here for example in the form of a roller conveyor, by means of which a respective construction box can be moved to its construction box construction position within the 3D printer.

FIGS. 13 and 14 show a plan view and a perspective view from above, respectively, of a 3D printer arrangement 200 which comprises a first and a second 3D printer 100 and 100', respectively.

Both 3D printers may, for example, be configured like the 3D printer 100 described with reference to FIGS. 11 and 12.

As illustrated by FIGS. 13 and 14, the first and second 3D printers 100, 100' may be arranged adjacent to each other in such a way that the introduction openings for introducing the construction boxes are opposite each other. A rail system 210 may for example extend between the two 3D printers, along which a common transportation device 220 can be displaced. The transportation device 220 may be used both by the first and the second 3D printer 100, 100' to equip the respective 3D printer with one or more construction boxes.

In addition, one or more optional components may be arranged along the rail system, for example a construction box stock 230 in which one or more construction boxes are held available, and/or a microwave oven 240 which may receive a construction box to (further) solidify a component contained therein, and/or an unpacking station 250 where a component contained in the construction box can be freed from loose, unsolidified particulate material and thus can be "unpacked", for example in an automated manner. In this context, reference number 260 indicates an optional component stock into which unpacked components (here for example casting molds and/or foundry cores) manufactured by means of a generative manufacturing process using one of the two 3D printers can be placed into storage.

The invention claimed is:

1. A coating device arrangement (1) for a 3D printer (100) comprising a coating device (3) having a carrier structure (21*a* to 21*c*) and a container (17) fixed to the carrier structure, which defines an inner cavity for receiving a particulate construction material and leads to an opening for outputting the particulate construction material, a vibration device (23) configured to vibrate the particulate construction material received in the container and thereby to influence the discharge of the particulate construction material from the opening, and a stroking member (15*a*) attached to the coating device, configured to stroke the particulate construction material outputted from the opening, to thereby level and/or compress the outputted particulate construction material, and a closing device (31) configured to selectively close the opening and comprising a closing member (31*a*) attached to the coating device (3), characterized in that the stroking member (15*a*) and/or the closing member (31*a*) is/are fixed to the carrier structure in a way to be vibration-decoupled from the vibration generated by the vibration device in the container (17).

2. A coating device arrangement (1) according to claim 1 further comprising a first and a second stroking member (15*a*, 15*b*) which are fixed to the carrier structure to be respectively vibration-decoupled from the vibration generated by means of the vibration device in the container (17).

3. A coating device arrangement (1) according to claim 1 further comprising a first and a second closing member (31*a*, 31*b*) which are fixed to the carrier structure to be respectively vibration-decoupled from the vibration generated by means of the vibration device in the container(17).

4. A coating arrangement (1) according to claim 1 wherein the stroking member (15a, 15b) and/or the closing member (31a, 31b) is/are fixed to the carrier structure (21a to 21c) in a substantially rigid way, or wherein the stroking member (15a, 15b) and/or the closing member (31 a, 31 b) is/are fixed to the carrier structure (21a to 21c) separately from a wall portion (17a) of the container, or wherein the stroking member (15a, 15b) and/or the closing member (31a, 31b) is/are fixed to the carrier structure (21a to 21c) separately from the container (17), or wherein the stroking member (15a, 15b) and/or the closing member (31a, 31b) is/are arranged at a vertical distance to the opening underneath the same, or wherein the stroking member (15a, 15b) and the closing member (31a, 31b) are fixed to the carrier structure (21a to 21c) together.

5. A coating device arrangement (1) according to claim 1 wherein a wall portion (17a) of the container (3) is attached to the carrier structure (21b) through the vibration device (23).

6. A coating device arrangement (1) according to claim 1 wherein a wall portion (17b) of the container (17) is fixed to the carrier structure (21a) by means of a damping device (25).

7. A coating device arrangement (1) according to claim 6, wherein the damping device (25) comprises a damping part (25b) arranged between the carrier structure (21a) and the wall portion (17b).

8. A coating device arrangement (1) according to claim 1 further comprising a charging container (19) arranged above the container (17) to supply the container with the particulate construction material, and which is vibration decoupled from the vibration generated by means of the vibration device in the container (17).

9. A coating device arrangement (1) according to claim 1 further comprising a control unit configured to control the vibration device (23) in such a way to selectively vibrate the particulate construction material.

10. A coating device arrangement (1) according to claim 1 further comprising a guiding structure (103) along which the coating device (3) is displaceable.

11. A 3D printer comprising a coating device arrangement (1) for a 3D printer (100), the coating device arrangement (100) having a coating device (3) having a carrier structure (21a to 21c) and a container (17) fixed to the carrier structure, which defines an inner cavity for receiving a particulate construction material, which leads to an opening for outputting the particulate construction material, a vibration device (23) configured to vibrate the particulate construction material received in the container and thereby to influence the discharge of the particulate construction material from the opening, and a stroking member (15a) attached to the coating device, configured to stroke the particulate construction material outputted from the opening, to thereby level and/or compress the outputted particulate material, and a closing device (31) configured to selectively close the opening and comprising a closing member (31 a) attached to the coating device (3), characterized in that
the stroking member (15a) and/or the closing member (31 a) is/are fixed to the carrier structure in a way to be vibration-decoupled from the vibration generated by the vibration device in the container (17).

12. A coating device arrangement (1) for a 3D printer (100) comprising a coating device (3) having a carrier structure (21a to 21c) and a container (17) fixed to the carrier structure, which defines an inner cavity for receiving a particulate construction material and leads to an opening for outputting the particulate construction material, a shaking device (23) configured to expose a first wall portion (17a) of the container to a shaking motion and to thereby influence the discharge of the particulate construction material from the opening, and a stroking member (15a) attached to the coating device, configured to stroke the particulate construction material outputted from the opening to thereby level and/or compress the outputted particulate construction material, and a closing device (31) configured to selectively close the opening and comprising a closing member (31 a) attached to the coating device (3), characterized in that
the stroking member (15a) and/or the closing member (31 a) is/are fixed to the carrier structure to be shaking motion-decoupled from the shaking motion generated by means of the shaking device on the first wall portion (17a) of the container.

13. A coating device arrangement (1) according to claim 12 further comprising a first and a second stroking member (15a, 15b) which are fixed to the carrier structure to be respectively shaking motion-decoupled from the first wall portion (17a) of the container.

14. A coating device arrangement (1) according to claim 12 further comprising a first and a second closing member (31a, 31b) which are fixed to the carrier structure to be respectively shaking motion-decoupled from the first wall portion (17a) of the container.

15. A coating arrangement (1) according to claim 12 wherein the stroking member (15a, 15b) and/or the closing member (31a, 31b) are fixed to the carrier structure (21a to 21c) in a substantially rigid way, or wherein the respective stroking member (15a, 15b) and/or the closing member (31a, 31b) are fixed to the carrier structure (21a to 21c) separately from the first wall portion (17a) of the container, or wherein the stroking member (15a, 15b) and/or the closing member (31a, 31b) are fixed to the carrier structure (21a to 21 c) separately from the container (17), or wherein the stroking member (15a, 15b) and/or the closing member (31a, 31b) are arranged at a vertical distance to the opening underneath the same, or wherein the stroking member (15a, 15b) and the closing member (31 a, 31 b) are fixed to the carrier structure (21a to 21c) together.

16. A coating device arrangement (1) according to claim 12 wherein the first wall portion (17a) of the container (3) is attached to the carrier structure (21b) through the shaking device (23).

17. A coating device arrangement (1) according to claim 12 wherein the shaking device (23) is formed by an eccentric device.

18. A coating device arrangement (1) according to claim 17 wherein the eccentric device comprises a shaft (23a) rotatably fixed to the carrier structure (21a), an eccentric (23c) attached to the shaft (23a), and a connecting rod (23b) connected to the first wall portion (17) of the container (3).

19. A coating device arrangement (1) according to claim 12 wherein a second wall portion (17b) of the container (17) is fixed to the carrier structure (21a) by means of a damping device (25).

20. A coating device arrangement (1) according to claim 19 wherein the damping device (25) comprises a damping part (25b) arranged between the carrier structure (21a) and the second wall portion (17b).

21. A coating device arrangement (1) according to claim 12 further comprising a charging container (19) arranged above the container (17) to supply the container with the particulate construction material, and which is shaking motion-decoupled from the shaking motion generated by means of the shaking device on the first wall portion (17*a*) of the container.

22. A coating device arrangement (1) according to claim 12 further comprising a control unit configured to control the shaking device (23) in such a way to selectively expose the first wall portion (17*a*) of the container (17) to a shaking motion, respectively.

23. A coating device arrangement (1) according to claim 12 further comprising a guiding structure (103) along which the coating device (3) is displaceable.

24. A 3D printer comprising a coating device arrangement (1) for a 3D printer (100), the coating device arrangement (1) comprising a coating device (3) having a carrier structure (21*a* to 21*c*) and a container (17) fixed to the carrier structure, which defines an inner cavity for receiving a particulate construction material and leads to an opening for outputting the particulate construction material, a shaking device (23) configured to expose a wall portion (17*a*) of the container to a shaking motion and to thereby influence the discharge of the particulate construction material from the opening, and a stroking member (15*a*) attached to the coating device, configured to stroke the particulate construction material outputted from the opening to thereby level and/or compress the outputted particulate material, and a closing device (31) configured to selectively close the opening and comprising a closing member (31 *a*) attached to the coating device (3), characterized in that the stroking member (15*a*) and/or the closing member (31 *a*) is/are fixed to the carrier structure to be shaking motion-decoupled from the shaking motion generated by means of the shaking device on the wall portion (17*a*) of the container.

* * * * *